(12) United States Patent
Boyce et al.

(10) Patent No.: US 6,416,669 B1
(45) Date of Patent: Jul. 9, 2002

(54) RESIN TRAP DEVICE FOR USE IN ULTRAPURE WATER SYSTEMS AND METHOD OF PURIFYING WATER USING SAME

(75) Inventors: Allen Boyce, Portland, OR (US); Michael Steven Marchando, Colorado Springs, CO (US); James Kenneth Webster, Bainbridge Island, WA (US)

(73) Assignee: SEH America, Inc., Vancouver, WA (US)

( * ) Notice: Subject to any disclaimer, the term of this patent is extended or adjusted under 35 U.S.C. 154(b) by 0 days.

(21) Appl. No.: 09/709,804

(22) Filed: Nov. 10, 2000

Related U.S. Application Data

(62) Division of application No. 09/121,369, filed on Jul. 23, 1998, now Pat. No. 6,183,637.

(51) Int. Cl.[7] .............................................. B01D 63/00
(52) U.S. Cl. ........................ 210/638; 210/650; 210/651; 210/681
(58) Field of Search ............................... 210/257.2, 266, 210/287, 293, 321.6, 291, 289, 638, 651, 650, 681

(56) References Cited

U.S. PATENT DOCUMENTS

| | | | |
|---|---|---|---|
| 3,662,893 A | 5/1972 | Humbert, Jr. | 210/315 |
| 3,732,981 A | 5/1973 | Mendelsohn | 210/94 |
| 3,768,650 A | 10/1973 | Zievers | 210/189 |
| 3,817,390 A | 6/1974 | Maruniak et al. | 210/460 |
| 3,826,375 A | 7/1974 | Fournier | 210/291 |
| 3,862,032 A | 1/1975 | Dixson | 210/189 |

(List continued on next page.)

FOREIGN PATENT DOCUMENTS

| | | | |
|---|---|---|---|
| EP | 0 249 049 A1 | 12/1987 | 210/257.2 |
| FR | 1577527 | 8/1969 | 210/652 |
| WO | WO 88 08737 A1 | 11/1988 | 210/257.2 |
| WO | WO 96 07462 A | 3/1996 | 210/652 |
| WO | WO 98 09916 A | 3/1998 | 210/652 |

OTHER PUBLICATIONS

Johnson's Hydrosphere® Nozzle Is Well Suited For Less Demanding Applications, U.S. Filter—Johnson Wellscreen, p. 11.

The Effects of Prolonged Exposure to Aqueous Ammonium Hydroxide on Polyvinylidene Fluoride Pipe, M. Burkhart et al., Microcontamination, Oct. 1992, pp. 27–36.

Fluoroplastics, Modern Plastics Encyclopedia 1989, p. 24.

How to Choose a Fluoropolymer, W. A. Miller, Chemical Engineering, Apr. 1993, pp. 163–167.

International Search Report, European Patent Office, Nov. 10, 1999, PCT/US99/16849.

*Primary Examiner*—Ernest G. Therkorn
(74) *Attorney, Agent, or Firm*—Alston & Bird LLP

(57) ABSTRACT

The present invention is directed to the use a of resin trap device to remove large resin particles from water in a water purification system to thereby protect downstream ultrafiltration equipment. The present invention includes a resin trap device which comprises a housing and a resin strainer disposed within the housing. The resin strainer includes a plurality of openings having a particle pass size of between about 100 μm and about 250 μm, and thus allows water and small particles to pass through the resin trap device and large particles to be retained in the resin trap device. The present invention also includes a water purification system including a water source, a resin bed and the resin trap device, and a method of purifying water using the resin trap device of the invention.

5 Claims, 4 Drawing Sheets

U.S. PATENT DOCUMENTS

| | | | |
|---|---|---|---|
| 3,994,812 A | 11/1976 | Nilsson | 210/172 |
| 4,319,999 A | 3/1982 | Gruesbeck | 210/95 |
| 4,336,140 A | 6/1982 | Smith et al. | 210/677 |
| 4,344,848 A | 8/1982 | Hakulinen | 210/617 |
| 4,383,920 A | 5/1983 | Muller | 210/93 |
| 4,659,460 A | 4/1987 | Muller | 210/87 |
| 4,749,640 A | 6/1988 | Tremont | 430/314 |
| 4,759,844 A | 7/1988 | Lipschultz et al. | 210/257.2 |
| 4,780,213 A | 10/1988 | Ogletree | 210/279 |
| 4,844,796 A | 7/1989 | Plester | 210/100 |
| 5,079,274 A | 1/1992 | Schneider et al. | 521/146 |
| 5,090,221 A | 2/1992 | Sewter | 210/167 |
| 5,115,280 A | 5/1992 | Hamada et al. | 355/299 |
| 5,116,509 A | 5/1992 | White | 210/644 |
| 5,154,809 A | 10/1992 | Oren et al. | 204/182.4 |
| 5,171,442 A | 12/1992 | Nakshbendi | 210/256 |
| 5,174,901 A | 12/1992 | Smith | 210/652 |
| 5,215,657 A | 6/1993 | Goldfield | 210/321.64 |
| 5,308,482 A | 5/1994 | Mead | 210/207 |
| 5,377,244 A | 12/1994 | Stenger | 376/305 |
| 5,391,301 A | 2/1995 | Sadler | 210/675 |
| 5,399,263 A | 3/1995 | Chomka et al. | 210/257.1 |
| 5,443,740 A | 8/1995 | Schmitt | 210/673 |
| 5,651,894 A | 7/1997 | Boyce et al. | 210/652 |
| 5,672,273 A | 9/1997 | Ball | 210/448 |

RESIN TRAP DEVICE FOR USE IN ULTRAPURE WATER SYSTEMS AND METHOD OF PURIFYING WATER USING SAME

CROSS REFERENCE TO RELATED APPLICATIONS

This application is a division of U.S. patent application Ser. No. 09/121,369, filed Jul. 23, 1998 now U.S. Pat. No. 6,183,637.

FIELD OF THE INVENTION

The invention relates to the use of ion-complexing resin beds in water purification systems, and more particularly, to a resin trap device for removing resin particles in ultrafiltration systems.

BACKGROUND OF THE INVENTION

The production of ultrapure water is essential to the fabrication of defect-free silicon chips in the microelectronics industry. Typically, producing ultrapure water involves treating water through a number of processes to remove ion contaminants. In particular, the ultrapure water (also known as deionized or high filtered water) must be virtually free of ionic contaminants, typically bringing the specific resistivity to greater than or equal to about 18.2 M·ohm·cm at 20° C.

In these water purification systems, water is initially treated by a series of steps which control the pH level of the intake water, add chlorine to control bacteria growth in the water, remove particulate matter, remove added chlorine so that it does not damage delicate downstream equipment, and warm the water to about 21° C. (70° F.). After these initial treatment steps, the water is typically deionized in a reverse osmosis process and then degassed. The water is then further deionized by a first set of resin beds. The resin beds include beads of an ion-complexing resin which are retained in the resin beds by a screen on the exit header pipes and laterals inside the bed. The water passes through the resin beds so that it intimately contacts the resin beads to remove ion contaminants from the water. The water then passes through a plurality of 1.0 $\mu$m particle pass size microfiltration modules or microfilters to remove resin particles which may have escaped the resin beds and entered the water purification system. These microfilters contain membranes of spun polypropylene or nylon which are housed in a stainless steel housing and arranged so that water enters the outer lumens of each microfilter and permeates to a common inner plenum within the housing. The water passes through the microfilters to an ultraviolet sterilization unit to control bacterial contamination and is typically stored as deionized water.

The deionized water from storage is then treated by a second set of water purification steps. These water purification steps include ultraviolet sterilization to control bacterial contamination and to convert organic materials to low molecular weight charged ions, and polishing reverse osmosis for the removal of charged ions and particulate matter. The water then passes through a final polishing system which includes another ultraviolet sterilizer and a second set of ion-complexing resin beds to remove ion contaminants from the water. Another set of microfilters is positioned downstream from the second set of resin beds to remove resin particles which may escape from the resin beds. These microfilters also have a small particle pass size (e.g. 1 $\mu$m absolute and 0.1 $\mu$m or 0.2 $\mu$m nominal rated) and include a polyvinylidene fluoride (PVDF) lined stainless steel housing to avoid parts per trillion metals contamination. Immediately after passing through these microfilters, the water advances to a set of cross-flow ultrafilters that remove additional ion contaminants and very small particles to produce ultrapure water.

One problem that occurs in these water purification processes is that resin particles escape the ion-complexing beds and become entrained in the water flow. This "fouling" of the water occurs, to some degree, during normal system operation of the purification system. However, events such as the breakage of exit flow strainers in the resin beds can cause a sudden large release of resin particles into the flow of water. This sudden release of resin particles can blind downstream microfilters and ultrafilters and clog system apertures and instrumentation thereby reducing or stopping the flow of water in the ultrafiltration process.

As mentioned above, the conventional method of removing resin particles from the water purification system prior to ultrafiltration is to use a plurality of microfilters having a maximum particle pass size of between 0.1 and 1 $\mu$m. Unfortunately, because of the small particle pass size of these microfilters, the high pressure drop through these microfilters significantly decreases the flow rate of the water through the water purification system. Therefore, ultrapure water often cannot be produced at the flow rates desired for manufacturing processes.

An additional problem associated with these microfilters is that it can be difficult to remove the resin particles trapped in the microfilters. In particular, these mirofilters cannot be flushed and thus resin particles accumulate in the microfilters. As a result, this accumulation makes it necessary to replace the microfilters in the water purification system on an annual or biannual basis. In particular, if these microfilters are not replaced, the water can become more readily contaminated and resin particles are more likely to be released into the water purification system. The replacement of microfilters causes great expense to the operation of the water purification system not only because the microfilters are expensive but because their replacement also requires that the entire purification system be shut down and opened to the atmosphere.

There is therefore a need in the art of ultrapure water systems for an apparatus and method to remove potentially damaging resin particles from the flow of water that does not cause an undesirable pressure drop, is not subject to contamination and is suitable for continuous operation and cleansing by flushing with water.

SUMMARY OF THE INVENTION

The present invention is a resin trap device and method of using same to remove large resin particles from the water in a water purification system. In particular, the resin trap device removes large resin particles to protect downstream ultrafiltration equipment from damage even when large releases of resin particles enter the purification system such as by breakage of the resin bed exit flow strainer in the system. The resin trap device of the invention does not cause an undesirable pressure drop in the water flow thereby allowing ultrapure water to be produced at good flow rates. In addition, the resin trap device can be cleansed by flushing with water or disassembly to remove resin particles and thus limit contamination of the water and the need to replace filtration apparatus on an annual or biannual basis.

In accordance with the present invention, it has been discovered that it is not necessary to remove resin particles down to micron size prior to the ultrafiltration of water. In particular, it has been discovered that a light flow of small particles having an average diameter of less than about 150 μm (6 mils) generally does not harm the ultrafiltration equipment and these small particles can be harmlessly diverted into a reject water stream and tapped out of the ultrafiltration system. Large resin particles having an average diameter of greater than about 150 μm, on the other hand, can harm the cross-flow ultrafiltration membranes found in the final cross-flow ultrafilters and can also harm other delicate equipment located downstream from the resin beds. Therefore, it has been determined that damage to the ultrafilters can be avoided by removing the large resin particles from the water purification system.

The present invention comprises a resin trap device for removing large resin particles from a water purification system. The resin trap device comprises a housing and one or more resin strainers disposed within the housing. Each resin strainer includes a plurality of openings having a particle pass size of between about 100 μm (4 mils) and about 250 μm (10 mils) thereby allowing water and particles having a particle size of less than the particle pass size to flow through the openings but not allowing particles having a particle size of greater than the particle pass size to flow through the openings. Preferably, the particle pass size is between about 125 μm (5 mils) and about 175 μm (7 mils), and more preferably, about 150 μm. By using resin strainers having these particle pass sizes, the majority, if not all, of the large resin particles can be removed while still maintaining a minimal pressure drop across the resin trap device. As a result, ultrapure water can be produced ac good flow rates and delivered at these rates to specific end uses.

The resin trap device of the invention can be included in a water purification system which comprises a source of water, a resin bed, and the resin trap device. The resin bed comprises an inlet for receiving water from the water source, a plurality of resin particles for intimately contacting the water and removing ions from the water, and an outlet. The resin trap device is external to the resin bed and in fluid communication with the outlet of the resin bed. In accordance with the invention, water and any particles entrained therein flow from the resin beds into the resin trap device and large particles having a diameter of greater than the particle pass size of the openings are retained in the resin trap device to prevent damage to downstream ultrafiltration equipment. Water and small particles having a diameter of less than the particle pass size of the openings flow through the openings, exit the resin trap device, and further advance to the ultrafiltration system. The small particles that enter the ultrafilters in the ultrafiltration system can then be easily diverted into a reject water stream and removed from the ultrafiltration system. The resulting filtrate from the ultrafiltration system is suitable for ultrapure water applications.

The present invention also includes a method of purifying and filtering water to produce water suitable for ultrafiltration. First, water is passed through a resin bed and intimately contacted with resin particles to remove ions from the water and thereby purify the water. The purified water that exits the resin bed is then advanced from the resin bed into a resin trap device comprising a housing and a resin strainer disposed within the housing. The resin strainer contains a plurality of openings having a predetermined particle pass size as described above and retains large particles having a diameter of greater than the particle pass size and allows water and small particles having a diameter of less than the particle pass size to flow through the resin trap device.

In one preferred embodiment of the invention, water is advanced from the resin bed directly into the housing, large particles are retained in the housing, and water and small particles are allowed to flow from the housing into the resin strainer and out of the resin trap device. In this embodiment, a fluid inlet in said housing is in fluid communication with the outlet of the resin bed and the resin strainer comprises an outlet. The water from the outlet of the resin bed enters through the fluid inlet in the housing, water and small particles pass through the openings in the resin strainer to an outlet of the resin strainer, the water and small particles exit the resin trap device through an outlet in the resin strainer, and the large particles are retained in the housing by the resin strainer.

In another preferred embodiment of the invention, water is advanced from the resin bed directly into the resin strainer, large particles are retained in the resin strainer, and water and small particles are allowed to flow from the resin strainer into the housing and out of the resin trap device. In this embodiment, the resin strainer further comprises an inlet in fluid communication with the outlet of the resin bed. The water from the outlet of the resin bed enters through the inlet of the resin strainer, the water and small particles pass through the openings into the housing, the water and small particles exit the housing through the outlet in the housing, and large particles are retained in the resin strainer.

In yet another preferred embodiment of the invention, the resin trap device comprises a housing including a fluid inlet for receiving a flow of water, a plurality of spherical resin strainers disposed within the housing, and a primary outlet in fluid communication with each of the resin strainers to allow the flow of water out of the resin trap device. The resin strainers each include a plurality of openings having a predetermined particle pass size as described above so that water enters the resin trap device through the inlet of the housing, water and small particles having a diameter of less than the particle pass size flow from the housing into the resin strainers through the openings and out of the resin trap device through the primary outlet, and large particles having a diameter of greater than the particle pass size are retained in the housing. The resin trap device can further include a plurality of secondary fluid outlets, each of which corresponds to a resin strainer and is in fluid communication with the primary outlet so that water and small particles flow from the resin strainers through the secondary outlets into the primary outlet and out of the resin trap device.

The resin trap device can be easily cleaned by flushing water through the resin trap device to force particles retained in the resin trap device into an auxiliary drain line. Typically, a valve attached to an outlet of the housing or the resin strainer is manipulated to provide water to clean the resin trap device. Alternatively, the resin trap device can be cleaned by isolation, removal and disassembly of the resin trap device. In either case, multiple resin trap devices are preferably provided in a parallel flow configuration to ensure continuous operation even during cleaning of one or more of the resin trap devices.

These and other features and advantages of the present invention will become more readily apparent to those skilled in the art upon consideration of the following detailed description and accompanying drawings which describe both the preferred and alternative embodiments of the present invention.

DETAILED DESCRIPTION OF THE PREFERRED EMBODIMENTS

Figure 1:
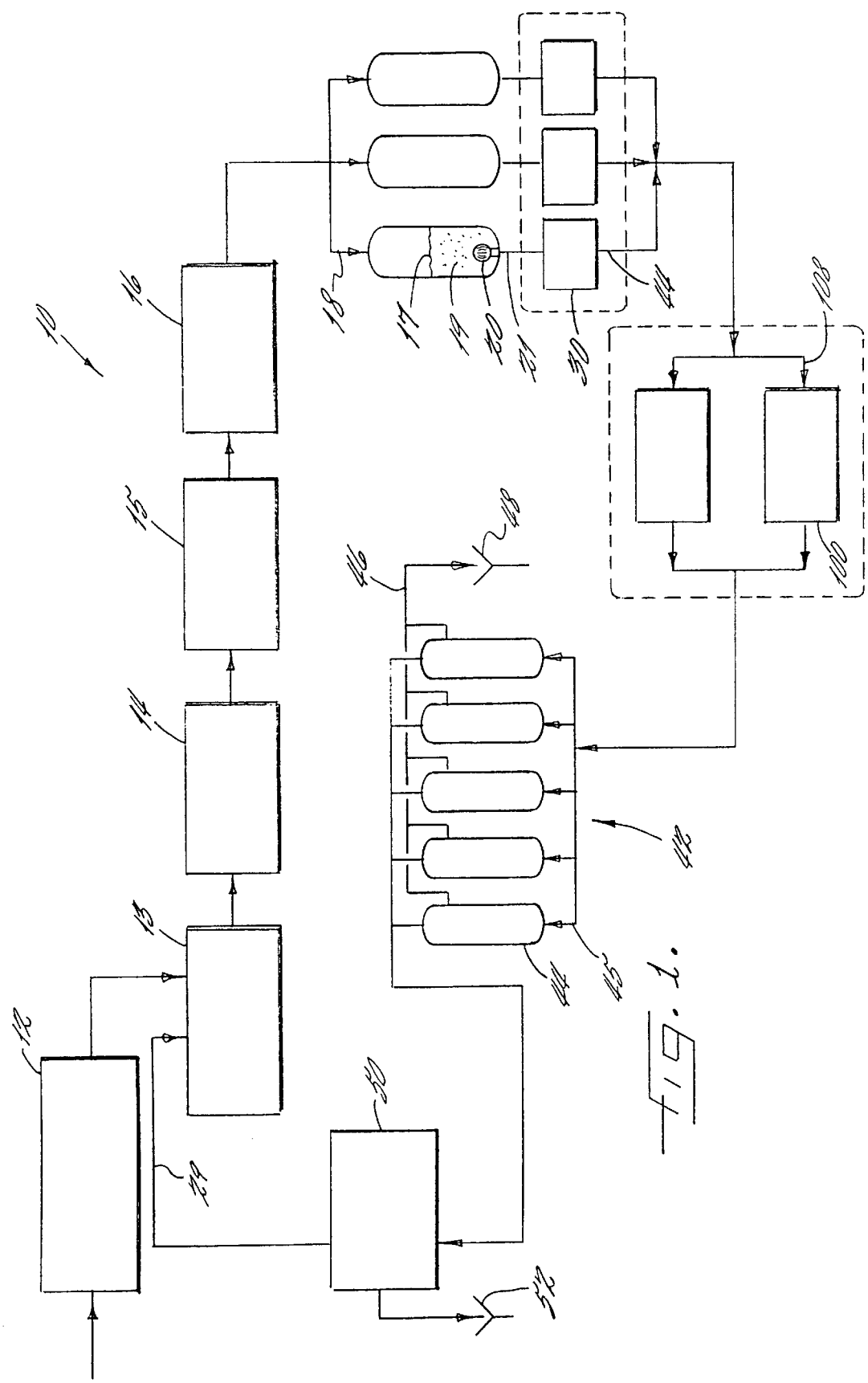
FIG. 1 is a schematic illustration of a water purification system including a resin trap device according to the present invention.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings like numbers refer to like elements throughout.

FIG. 1 illustrates a preferred water purification system 10 for use in the invention. In accordance with the invention, water is initially treated by a series of initial treatment units indicated generally at 12. These units 12 can be used to control the pH level of the intake water, to add chlorine to control bacterial growth in the water, to remove particulate matter such as silica particles, to remove added chlorine so that it does not damage delicate downstream equipment, and to warm the water to about 21° C. (70° F.). The water can then be subjected to reverse osmosis treatment, degasification, primary deionization and filtration, and ultraviolet radiation treatment. After this initial treatment, the water can be stored in a deionized water storage tank 13. The water from the tank 13 is then advanced to an ultraviolet sterilizer 14 to reduce the total oxidizable carbon (TOC) content by breaking down organic contamination into lower molecular weight organic charged ions. The water from the sterilizer 14 is then advanced to a reverse osmosis system 15 for deionization and then to a second ultraviolet sterilizer 16 for treatment and removal of bacterial contamination.

Figure 2:
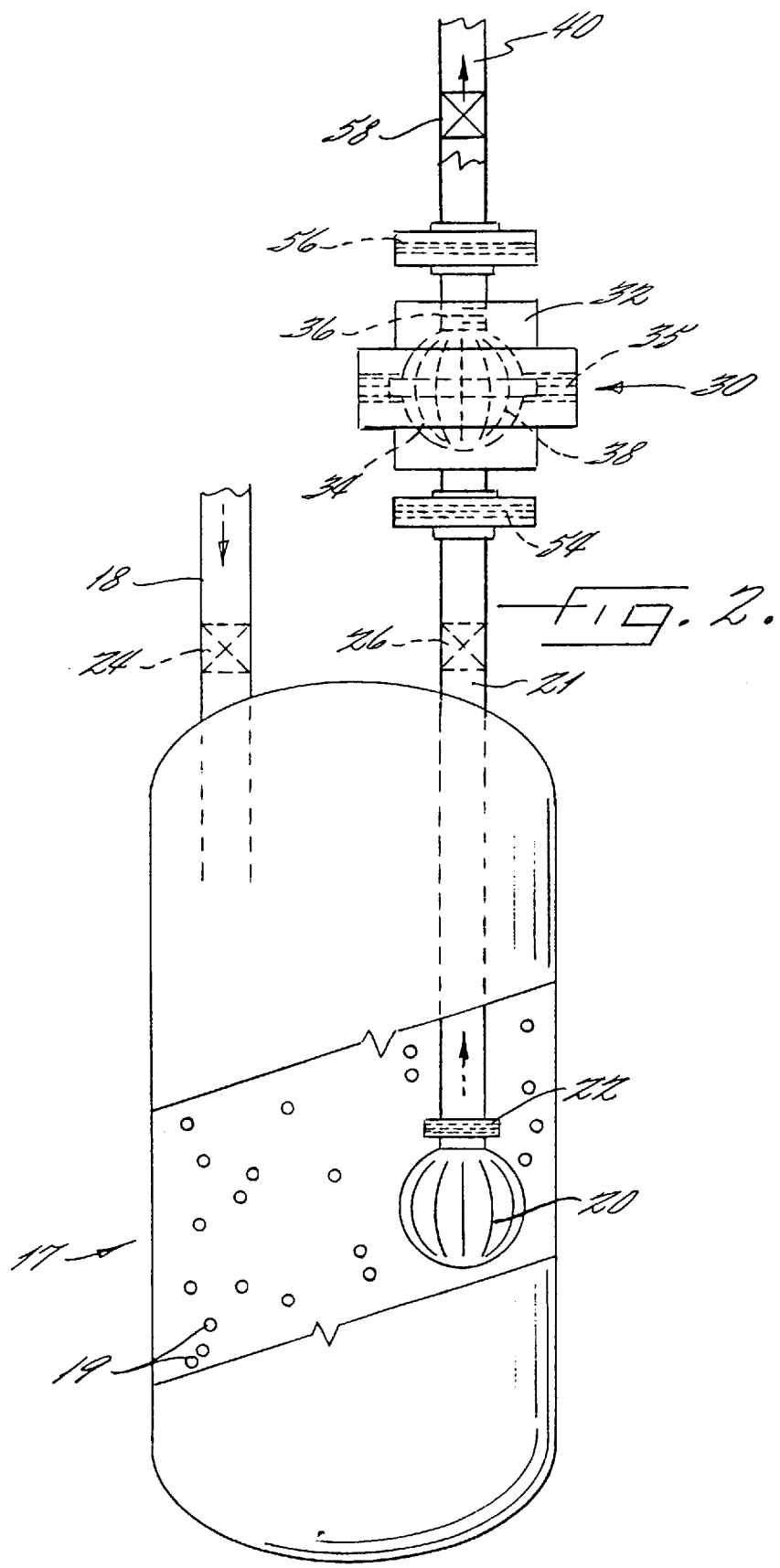
FIG. 2 is a side cutaway view of an embodiment of a resin trap device according to the present invention.

The water exiting the ultraviolet sterilizer 16 is then further deionized by passing the water through a set of resin beds 17 arranged parallel to one another. An exemplary resin bed 17 is illustrated in FIG. 2. The water enters the resin beds 17 through an inlet 18. As shown in the cutaway portion of the resin bed 17 in FIG. 2, the resin beds include a mixture of beads 19 of ion-complexing resins, e.g., strong acid cation, strong base anion, and inert resins. These beads 19 are retained in the resin bed 17 by an exit flow strainer 20 which is connected to the outlet line 21 by a threaded connection 22. During operation, water passes through the inlet 18 into the resin bed 17, intimately contacts the resin beads 19, and flows through the strainer 20 and out of the resin beds through an outlet line 21. The inlet line 18 and outlet line 21 also include isolation valves 24 and 26 which allow the resin bed 17 to be disconnected from the water purification system for service (e.g. replacement of the strainer 20) and cleaning.

The exit flow strainer 20 in the resin bed 17 is designed to prevent large resin particles from flowing into the outlet line 21. Nevertheless, although the exit flow strainer 20 prevents most of the large resin particles from flowing into the outlet line 21, the strainer is subject to breakage which causes a large release of resin particles. In addition, resin particles often enter the outlet line 21 through the threaded connection 22. As described above, large resin particles can damage downstream equipment, most notably, the ultrafiltration equipment.

In the present invention, a resin trap device is located in fluid communication with and downstream from the resin beds 17, and is used in place of conventional microfilters in the water purification system 10. As shown in phantom in FIG. 1, a resin trap device 30 can be included in the outlet line 21 of the resin bed 17 or a resin trap device 100 can be located further downstream in the water purification system 10. As shown in FIG. 1, more than one resin trap device is preferably provided in parallel to allow continuous operation of the water purification system 10 even during cleaning of the resin trap devices. For example, for the resin trap devices 30 illustrated in FIG. 1, more than one resin bed 17 is provided in parallel, each with a corresponding resin trap device 30. Alternatively, the resin trap devices 100 illustrated in FIG. 1 are provided as separate units in parallel. The resin trap devices used in accordance with the invention remove large particles from the water purification system thereby limiting damage to downstream equipment such as the ultrafiltration equipment in ultrafiltration system 42. The water and entrained small particles that exit the resin trap device further advance to the ultrafiltration system 42. The ultrafiltration system 42 comprises one or more ultrafilters 44, typically in parallel, and water enters the ultrafilters by inlets 45. The water that exits the ultrafilters 44 is ultrapure and preferably has a specific resistivity of greater than or equal to 18 M·ohm·cm at 20° C. In addition, any small particles that enter the ultrafilters 44 are typically harmlessly sloughed off the ultrafiltration membranes in the ultrafilters and into a reject water stream 46 that flows out of ultrafiltration system 42 into a drain 48 or to other less critical uses. The ultrapure water can flow to a specific point of use 50 and then either be sent to a drain line 52 or recycled to the storage unit 13.

FIG. 2 illustrates one embodiment of the invention wherein the resin trap device 30 is included in the outlet line 21 of the resin bed 17. In FIG. 2, the resin trap device 30 is installed in the outlet line 21 using a pair of threaded connections 54 and 56. However, although threaded connections 54 and 56 are illustrated, union or flanged connections can also be used. In accordance with the invention, the resin trap device 30 comprises a housing 32 and at least one resin strainer 34 disposed within the housing. The resin strainer 34 can be generally spherical, generally cylindrical or any other suitable shape. The housing 32 corresponds to the shape of the resin strainer 34 and is generally cylindrical. In the embodiment illustrated in FIG. 2, the resin strainer 34 is generally spherical and the housing 32 is generally cylindrical. In the embodiment of FIG. 2, the housing 32 is held together by a threaded connection 35 to allow easy disassembly but can be held together by alternative means. In addition, as illustrated in FIG. 2, the resin strainer 34 is preferably connected to the housing by a threaded connection 36 to allow easy removal of the resin strainer.

According to the invention, the resin strainer 34 comprises a plurality of openings 38 having a particle pass size of between about 100 $\mu$m and about 250 $\mu$m. Preferably, the particle pass size is between about 125 $\mu$m and about 175 $\mu$m, more preferably about 150 $\mu$m. The term "particle pass size" as used herein describes the maximum particle size which can pass through the openings 38 of the resin strainer 34, i.e., openings having a 150 $\mu$m particle pass size have dimensions such that particles having a diameter of less than 150 $\mu$m can pass through the openings and particles having a diameter of greater than 150 μm cannot pass through the openings. In the embodiment illustrated in FIG. 2, the openings 38 are generally vertical but can be generally horizontal or any other orientation which allows retention of the large particles without a significant pressure drop across the resin trap device 30.

For use in the water purification system 10, the resin strainer 34 and at least an inner surface of the housing 32 are preferably constructed of an inert polymer material to prevent contamination of the water in the resin trap device 30. In addition, the piping of the water purification system 10 is preferably formed of an inert polymer material. Preferably, the inert polymeric material is a fluorinated polymer such as polyvinylidene fluoride (PVDF), polytetrafluoroethylene (PTFE), fluorinated ethylene propylene (FEP), perfluoroalkoxy (PFA) polymers, polychlorotrifluoroethylene (PCFE), ethylene tetrafluoroethylene (ETFE), and ethylene chlorotrifluoroethylene (ECTFE). More preferably, the fluorinated polymer is PVDF. The remainder of the housing 32 can be formed of a fluorinated polymer or any other suitable material such as stainless steel. Preferably, for the embodiment of FIG. 2, the entire housing 32 is formed of a translucent inert polymer material such as PVDF.

In operation of the embodiment of FIG. 2, water lows into the resin bed 17 through inlet line 18 where the water intimately contacts a plurality of ion-complexing resin beads 19. The water then flows into the outlet line 21 of the resin bed 17 through a exit flow strainer 20. The water and any particles which escape the exit flow strainer 20 flow from the outlet line 21 into the housing 32. The water and particles smaller than the particle pass size of the openings 38 flow into the resin strainer 34 and out of the resin trap device 30 through an outlet 40. The large particles having a diameter greater than the particle pass size, on the other hand, are retained in the housing 32.

The resin trap device 30 of FIG. 2 can be easily removed and cleaned to remove particles retained in the housing 32. In accordance with the invention, pressure indicators (not shown) can be located in the outlet line 21 (or resin trap device inlet) and outlet line 40. A high differential in pressure between these pressure indicators, e.g., greater than 2 psi, or visual presence of resin particles as observed through the translucent walls of the housing 32 can be used to indicate a need to clean the resin trap device 30. In order to clean the resin trap device 30, the threaded connections 54 and 56 can be disconnected to remove the resin trap device from the outlet line 21. Typically, this is accomplished by closing a valve 58 in the outlet 40 and the valve 26 and disconnecting the threaded connections 54 and 56. Once removed from outlet line 21, the housing 32 of the resin trap device 30 can be opened by disconnecting the threaded connection 35 to remove any retained particles from the housing or to replace the resin strainer 34 if desired. The resin trap device 30 can then be easily reassembled and reinstalled for use in the invention.

Figure 3:
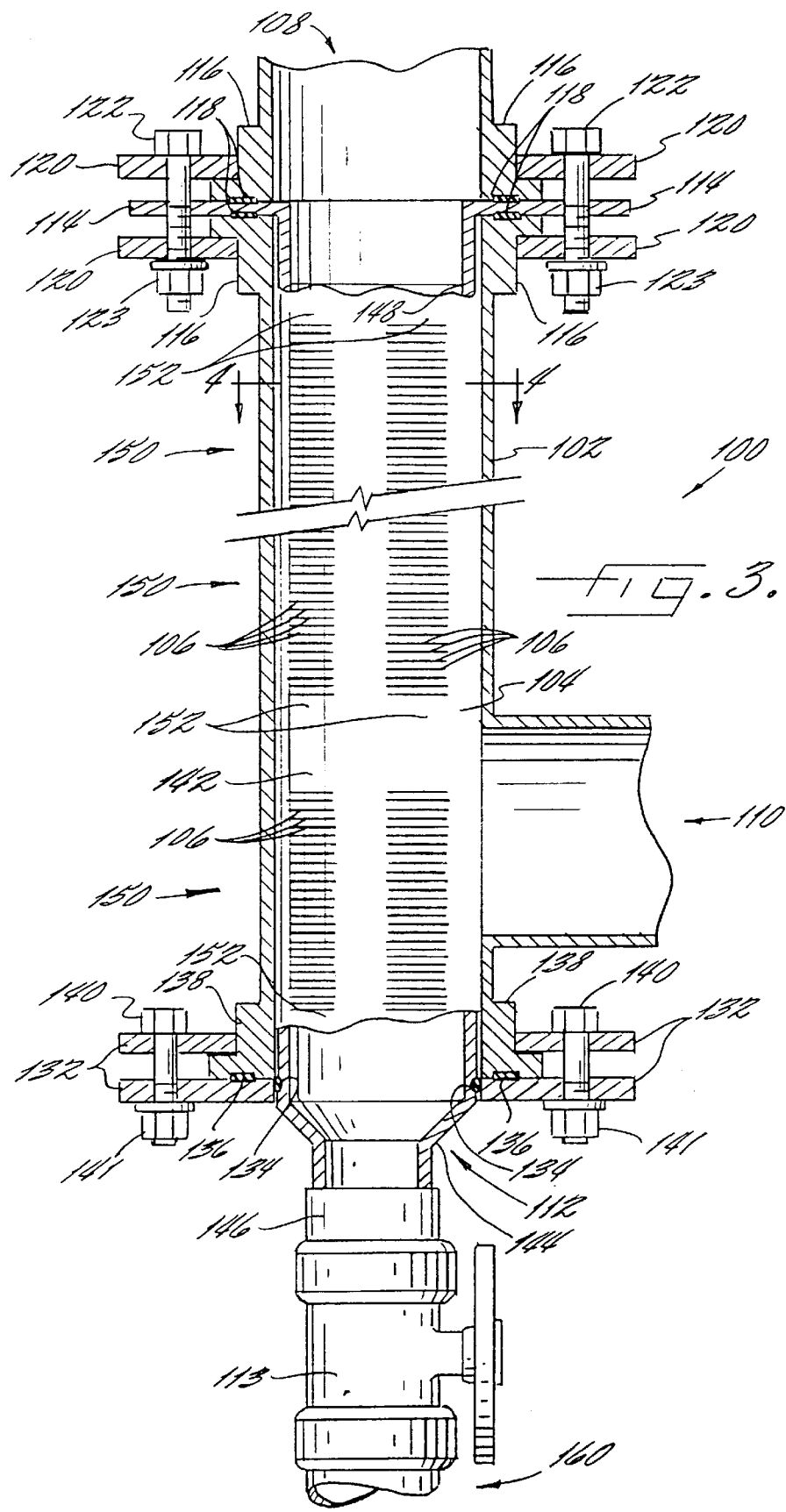
FIG. 3 is a side cutaway view of another embodiment of a resin trap device according to the present invention.
Figure 4:
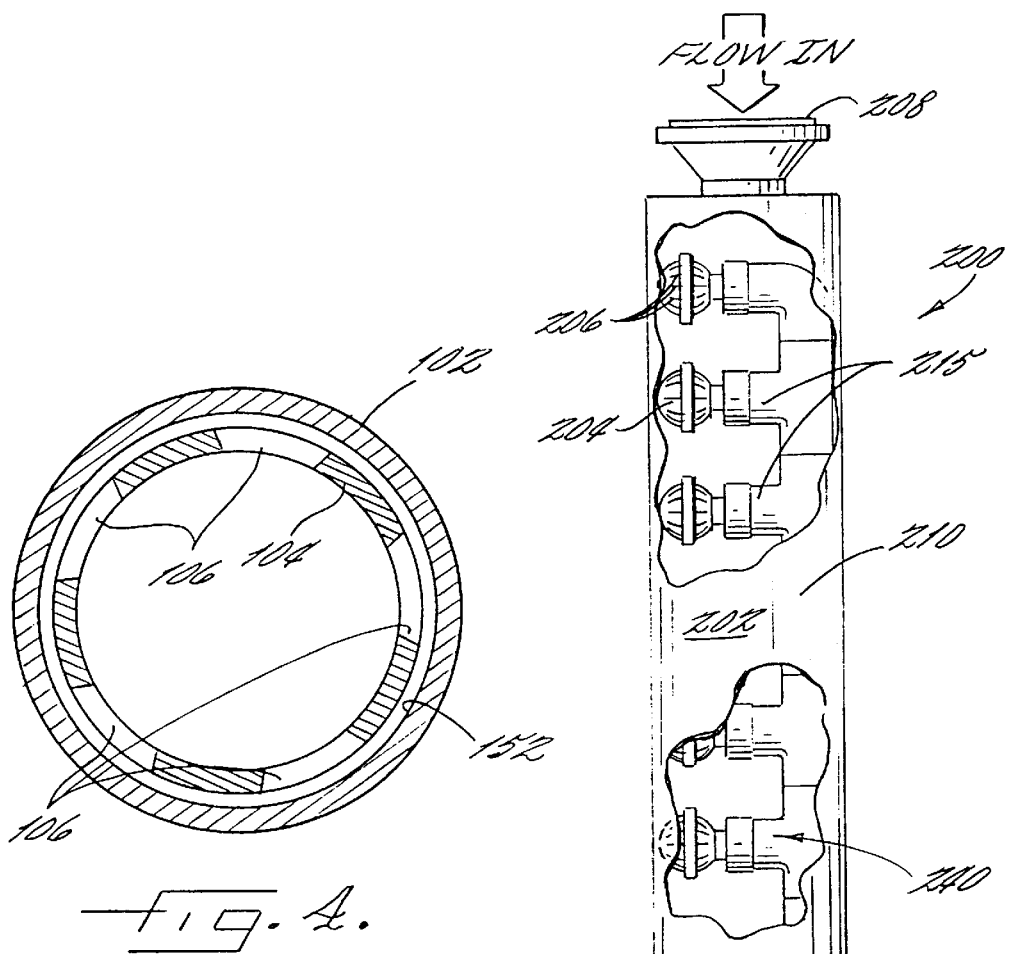
FIG. 4 is a cross-sectional view of the resin trap device of FIG. 3 taken along line 4—4 of FIG. 3.

FIGS. 3 and 4 illustrate one embodiment of the resin trap device 100. The resin trap device 100 includes a generally cylindrical housing 102 and a cylindrical resin strainer 104 concentrically disposed within the housing. The resin strainer 104 includes a plurality of openings 106 having a particle pass size of between about 100 μm and about 250 μm, preferably between about 125 μm and about 175 μm, and more preferably about 150 μm. In the embodiment shown in FIG. 2, the openings 106 in the resin strainer 104 are horizontal slots but can be vertical slots or have any other orientation in accordance with the invention. The materials used in the resin trap device are as described above with the resin strainer 104 and inner surface 152 of the housing 102 being preferably formed of an inert polymer material and the remainder of the housing being formed either of an inert polymer material or stainless steel.

During operation of the resin trap device 100 of FIGS. 3 and 4, water flows into the resin trap device through inlet 108 which is in fluid communication with the resin strainer 104. Water and small resin particles flow through the openings 106 and into the housing 102 and out of the resin trap device 100 through an outlet 110. As illustrated in FIG. 2, the outlet 110 has an axis that is perpendicular to the axis of inlet 108 but the axis of the outlet 110 can be oriented in other relationships with the axis of the inlet (e.g. collinear or parallel). The large particles having a diameter of greater than the particles pass size cannotflow through openings 106 and are trapped in the resin strainer 104 thereby limiting damage to downstream ultrafiltration equipment.

The resin strainer 104 and the housing communicate at a discharge end 112 with a valve 113 such as a ball or diaphragm vale. The valve 113 is closed during normal operation of the resin trap device 100 but can be opened to permit flusing of the resin strainer 104 to remove retained resin particles. In particular, when the accumulation of large resin particles in the resin strainer 104 causes an undesirable pressure drop across the resin trap device 100 as measured by pressure indicators (not shown) in the inlet 108 and outlet 110, the resin strainer 104 can be flushed by opening the valve 113 and flowing water through the resin strainer and out through an auxiliary line 160.

The resin strainer 104 is retained in the resin trap device 100 in the area of the inlet 108 by an apertured flange 114 that is compressed and retained by a pair of housing flange adapters 116. A pair of ring gaskets 118 are interposed between flange 114 and adapters 116 to form a watertight seal. A first pair of first apertured flange rings 120 are retained and compressed about adapters 116 by a first set of fasteners 122 such as bolts which extend through the apertures of flange 114 and a pair of securing means 123 such as nuts secure the fasteners. At the discharge end 112, housing 102 is sealingly joined to the resin strainer 104 by a second pair of apertured flange rings 132, a first single O-ring 134, a second single O-ring 136, a single housing flange adapter 138 and a second set of bolts 140 and nuts 141.

In one embodiment, the resin strainer 104 is 1.2 meters long and comprises an elongate cylindrical section 142 having an inner diameter of 81.4 mm and an outer diameter of 90.0 mm. The resin strainer 104 has a neck 146 that is sealingly mated with valve 113. The resin strainer 104 can be made of cylindrical sections that are infrared butt fusion welded together at a set of weld points 148. The housing 102 in the resin trap device 100 preferably has an inner diameter of 99.2 mm and an outer diameter of 110 mm. The slots 106 are preferably 31.8 mm long, about 150 microns wide, and are spaced apart by 3.2 mm into a set of groups 150 of 46 slots. Groups 150 are spaced apart by a set of 12.7 mm gaps 152.

Figure 5:
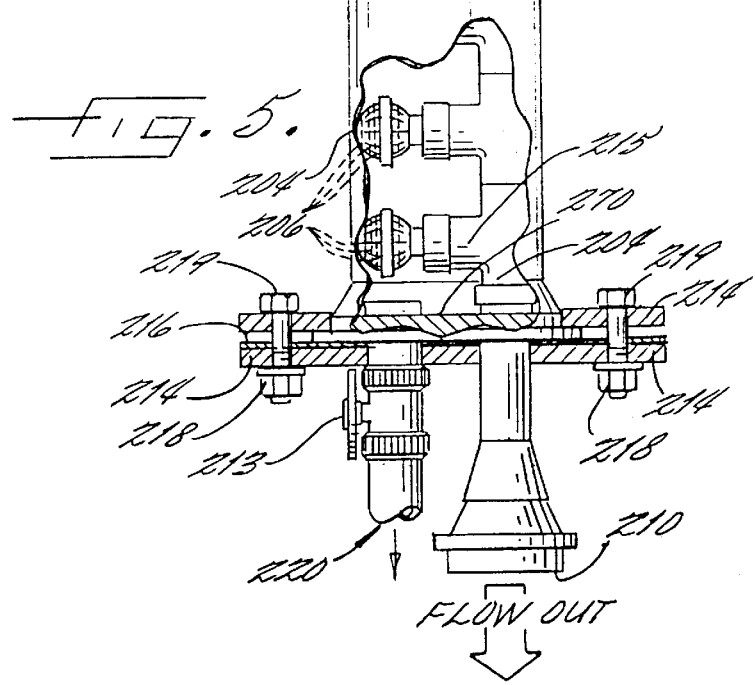
FIG. 5 is a side cutaway view of yet another embodiment of a resin trap device according to the present invention.

FIG. 5 shows an alternative preferred embodiment of a resin trap device 200 according to the invention that can be used in place of the resin trap device 100. The resin trap device 200 includes a cylindrical housing 202 and a plurality of spherical resin strainers 204 disposed within the housing. The materials used in the housing 202 and resin strainers 204 are preferably the same as those described for the embodiment of FIGS. 3 and 4. The resin strainers 204 each contain a plurality of openings 206 having a particle pass size such as described above. As shown in FIG. 5, the openings 206 are horizontally oriented but can be oriented differently as described above. The resin trap device 200 also includes a primary outlet 210 and a plurality of secondary outlets 215 which are in fluid communication with then resin strainers 204 and the outlet 210. The number of secondary outlets 215 is the same as the number of resin strainers 204 and each secondary outlet is matched with a resin strainer. The resin strainers 204, primary outlet 210 and secondary outlets 213 form a manifold assembly 240 which has been found particularly useful for use in the invention. The manifold assembly 240 is sealingly fitted into the resin trap device 200 through end wall 270 of housing 202. Specifically, the manifold 240 is retained in the end wall 270 by a pair of apertured flange rings 214. The flange rings 214 are retained and compressed about a gasket 216 by a first set of fasteners 218 such as bolts which extend through the apertures of flange 214 and a pair of securing means 219 such as nuts secure the fasteners.

In operation of the resin trap device of FIG. 5, water enters the resin trap device 200 through an inlet 208 which is in fluid communication with the housing 202 and flows into the housing. Water and small resin particles then flow into the resin strainers 204 through openings 206 into the secondary outlets 215 and out of the resin trap device 200 through primary outlet 210. When the large resin particles accumulate in the housing 202 and cause a corresponding undesirable pressure drop across the resin trap device 200 as measured by pressure indicators (not shown) in the inlet 208 and outlet 210, the housing can be flushed by opening the valve 213 and flowing water through the inlet 208 and into the housing and forcing resin particles out of the resin trap device through an auxiliary line 220.

As will be readily understood by those skilled in the art, the present invention represents a new paradigm in water purification and ultrafiltration systems. In particular, rather than removing resin particles down to the micron size, only the larger particles which are more likely to damage the downstream ultrafiltration equipment are removed from the water purification system. Therefore, the resin trap device of the invention does not cause an undesirable pressure drop in the water flow thereby allowing ultrapure water to be produced at good flow rates. For example, the resin trap device 200 of FIG. 5 has demonstrated a pressure drop of only 0.5 psig at a flow rate of 61 gpm (gallons per minute) as compared to pressure drops of 8 to 14 psig at flow rates of 50 to 85 gpm across conventional microfilters. As a result, water purification systems in accordance with the invention can more easily meet capacity demands and have sufficient pressure to be used in spray nozzles and with other end use equipment.

In addition to helping to produce ultrapure water at good flow rates, the resin trap device can also be easily cleansed by flushing or disassembly to remove resin particles and thus limit contamination of the water. Moreover, the resin trap device of the invention does not need to be replaced on an annual or biannual basis thus reducing operating costs minimizing downtime, and eliminating potential contamination from obtrusive entry into the water purification system. Because the resin trap device can be formed completely of fluorinated polymer and does not have to be formed of a fluorinated polymer lined stainless steel, the resin trap device also is not subject to the contamination that can occur when the liner is damaged. Furthermore, the resin trap device of the invention can be sterilized by ozonation, peroxide, hot water, or other standard ultrapure water sterilization methods.

It is understood that upon reading the above description of the present invention and reviewing the accompanying drawings, one skilled in the art could make changes and variations therefrom. These changes and variations are included in the spirit and scope of the following appended claims.

That which is claimed:

1. A method of producing ultrapure water, comprising the steps of:

passing water through a resin bed and intimately contacting the water with resin particles in the resin bed to remove ions and minerals from the water and thereby purify the water;

advancing the purified water from the resin bed into a resin trap device external from said resin bed, the resin trap device comprising a housing and resin strainer disposed within the housing, the resin strainer including a plurality of openings having a particle pass size of between about 100 m and about 250 m;

retaining large particles having a diameter of greater than the particle pass size of the openings in the resin trap device;

allowing water and small particles having a diameter of less than the particle pass size of the openings to flow out of the resin trap device; and filtering the from said advancing step through an ultrafilter downstream from the resin trap device to produce ultrapure water having a specific resistivity of greater than or equal to 18 M·ohm·cm at 20° C.;

wherein said method is free of microfiltration steps between said advancing step and said filtering step wherein the water is filtered through microfilters having a maximum particle pass size of between 0.1 $\mu$m and 1 $\mu$m.

2. The method according to claim 1 wherein said advancing step comprises advancing the water into a resin strainer wherein the openings of the resin strainer have a particle pass size of between about 125 $\mu$m and about 175 $\mu$m.

3. The method according to claim 1 wherein said advancing step comprises advancing the water from the resin bed directly into the housing, said retaining step comprises retaining large particles in the housing, and said allowing step comprises allowing water and small particles to flow from the housing into the resin strainer and out of the resin trap device.

4. The method according to claim 1 wherein said advancing step comprises advancing the water from the resin bed directly into the resin strainer, said retaining step comprises retaining large particles in the resin strainer, and said allowing step comprises allowing water and small particles to flow from the resin strainer into the housing and out of the resin trap device.

5. The method according to claim 1 further comprising the step of flushing water through said resin trap device to force the water and the particles retained in the resin trap device into the auxiliary line.

* * * * *

UNITED STATES PATENT AND TRADEMARK OFFICE
CERTIFICATE OF CORRECTION

PATENT NO. : 6,416,669 B1  Page 1 of 1
DATED : July 9, 2002
INVENTOR(S) : Boyce et al.

It is certified that error appears in the above-identified patent and that said Letters Patent is hereby corrected as shown below:

Column 10,
Line 23, "100 m" should read -- 100 µm; "250 m" should read -- 250 µm --.
Line 30, before "from" insert -- water --.

Signed and Sealed this

Third Day of December, 2002

JAMES E. ROGAN
*Director of the United States Patent and Trademark Office*